(12) United States Patent
Highman et al.

(10) Patent No.: US 10,951,554 B1
(45) Date of Patent: Mar. 16, 2021

(54) SYSTEMS AND METHODS FACILITATING BOT COMMUNICATIONS

(71) Applicant: Genesys Telecommunications Laboratories, Inc., Daly City, CA (US)

(72) Inventors: Christopher Highman, Indianapolis, IN (US); Andrew Kauffman, Indianapolis, IN (US); Chuck Kirkpatrick, Indianapolis, IN (US); Kevin Wiegand, Indianapolis, IN (US); Guysung Kim, Indianapolis, IN (US)

(*) Notice: Subject to any disclaimer, the term of this patent is extended or adjusted under 35 U.S.C. 154(b) by 0 days.

(21) Appl. No.: 16/569,519

(22) Filed: Sep. 12, 2019

(51) Int. Cl.
*H04L 12/58* (2006.01)
*G06Q 30/06* (2012.01)

(52) U.S. Cl.
CPC ......... *H04L 51/02* (2013.01); *G06Q 30/0641* (2013.01); *H04L 51/046* (2013.01)

(58) Field of Classification Search
CPC .... H04L 51/02; H04L 51/046; G06Q 30/0641
See application file for complete search history.

(56) References Cited

U.S. PATENT DOCUMENTS

2018/0278750 A1    9/2018   Avila et al.
2018/0302347 A1*  10/2018   Landowski ............. H04L 51/32
2019/0102701 A1    4/2019   Singaraju et al.
2019/0182382 A1*   6/2019   Mazza ................ G06F 16/3329
2019/0199658 A1    6/2019   Kim et al.

FOREIGN PATENT DOCUMENTS

EP            3407548 A1      11/2018

OTHER PUBLICATIONS

PCT Written Opinion and Search Report for co-pending application PCT/US2020/050413 dated Dec. 21, 2020.

* cited by examiner

*Primary Examiner* — June Y Sison

(57) ABSTRACT

A method for delivering messages from customers to bots that includes providing a bot gateway and, pursuant to a process, formatting and sending the messages. The bot gateway includes bot schemas that each defines a data field arrangement for sending requests to a particular bot. The process includes receiving a first message and determining therefrom a first customer, a first tenant, a first bot, and a text message from the first customer to the first bot. The process includes: providing a bot configuration data set; selecting a first bot schema pertaining to the first bot; creating a formatted request via mapping the text message and the data values defined in the bot configuration data set to corresponding data fields defined within the data field arrangement; and sending the formatted request to the first bot.

17 Claims, 8 Drawing Sheets

SYSTEMS AND METHODS FACILITATING BOT COMMUNICATIONS

BACKGROUND

The present invention generally relates to telecommunications systems in the field of customer relations management including customer assistance via internet-based service options. More particularly, but not by way of limitation, the present invention pertains to systems and methods for facilitating bot communications via a common cloud-implemented bot gateway.

SUMMARY

Embodiments of the present invention may include a processor-implemented systems and methods that facilitate delivery of messages from customers to bots, wherein tenants use a software program over a network to manage interactions with respective ones of the customers. The method may include the steps of providing a bot gateway and, pursuant to a process, using the bot gateway to format the messages for delivering to the bots. The bot gateway may include a bot schema library in which is stored a plurality of bot schemas, wherein each of the bot schemas defines a data field arrangement in accordance with a unique template for sending requests to a particular one of the bots. The process may include the steps of: receiving a first one of the messages (hereinafter "first message"); analyzing the first message to determine therefrom: a pertinent one of the customers (hereinafter designated as a "first customer"); a pertinent one of the tenants (hereinafter designated as a "first tenant"); a pertinent one of the bots (hereinafter designated as a "first bot"); and a text message from the first customer that is intended for delivery to the first bot; providing a bot configuration data set, the bot configuration data set comprising data values related to a usage case pairing the first tenant with the first bot; selecting from the bot schema library a first one of the plurality of bot schemas (hereinafter "first bot schema") that pertains to the first bot; creating a formatted request via mapping the text message and the data values defined in the bot configuration data set to corresponding data fields defined within the data field arrangement of the first bot schema; and sending the formatted request to the first bot.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Figure 1:
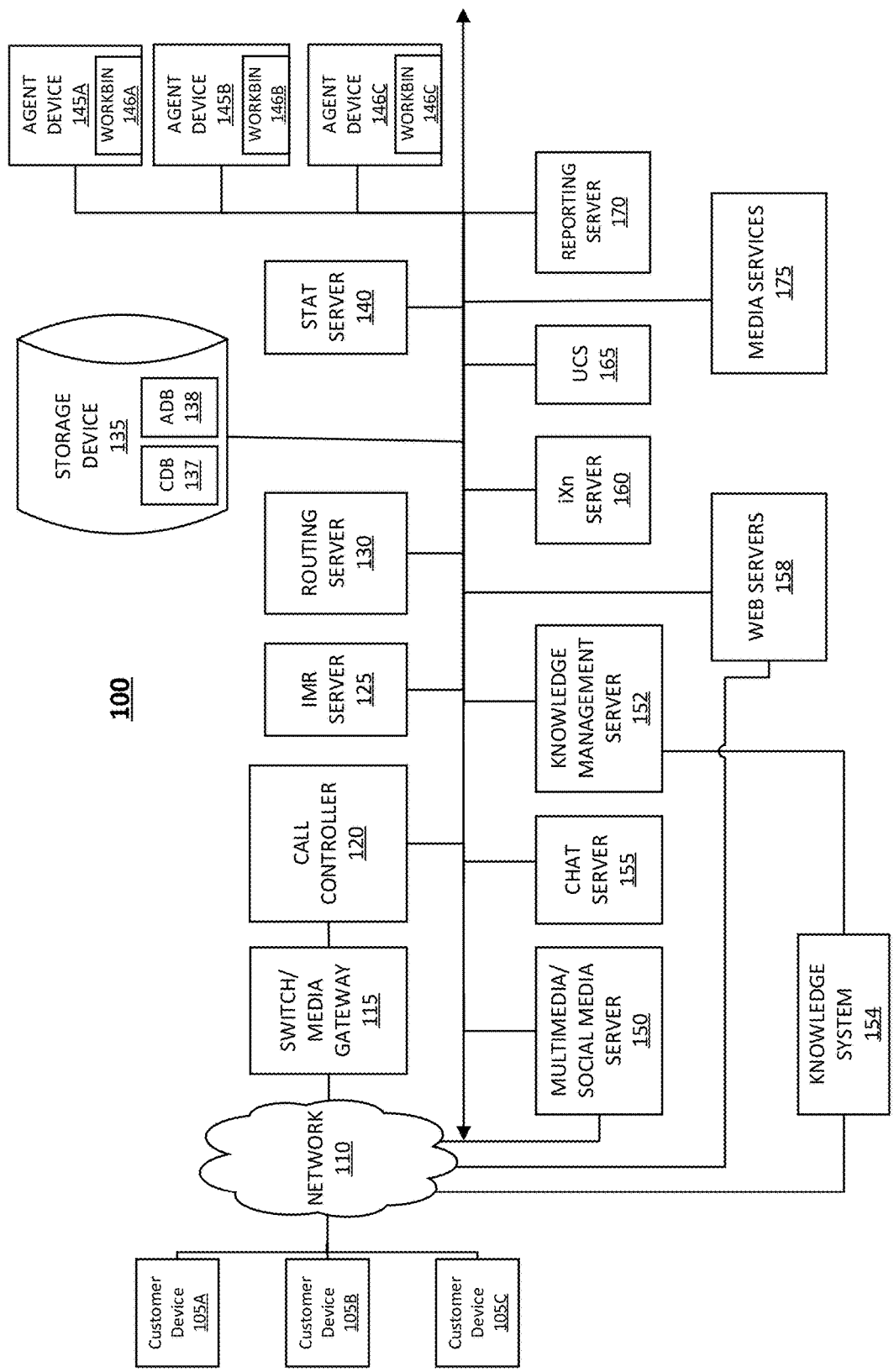
FIG. 1 is a block diagram of a contact center according to embodiments of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present invention relates to telecommunication systems and, more particularly, though without limitation, to contact centers. By way of general background, contact centers are staffed with employees or agents (referred to herein as human agents or, simply, agents) who serve as an interface between an organization, such as a company or enterprise, and outside entities, such as customers and other end users (referred to herein generally as customers). For example, human agents at a contact center may assist customers in making purchasing decisions and may receive purchase orders from those customers. Similarly, human agents at contact centers may assist or support customers in solving problems with products or services provided by the organization. Such interactions between contact center agents and outside entities or customers may be conducted by speech voice (e.g., telephone calls or voice over IP or VoIP calls), video (e.g., video conferencing), text (e.g., emails and text chat), or through other media.

To remain competitive, businesses constantly strive to provide high quality customer service through such contact centers, while minimizing the costs of providing those services. One alternative is to provide live human agents to handle every interaction with customers. However, this alternative is generally prohibitively expensive, with the high costs to the business eventually being passed on to consumers in the form of increased product prices. Additionally, coordinating the availability of live human agents qualified to handle a wide variety of customer needs is complicated and time consuming, and often results in reduced customer satisfaction due to the long wait times for specialized human agents to become available. Because of this, most contact centers utilize some level of automated processes in place of live agents. In many cases this has proven to be a successful strategy, as automated processes—which may be referred to herein also as robots or, simply, as "bots"—can be highly efficient in handling certain types of interactions and, thus, effective at lowering cost by decreasing the need for human agents. Automated interactions also can be structured in a way that optimizes efficiency and promotes repeatability. Whereas a human agent may forget to ask certain questions or follow-up on particular details, such mistakes are typically avoidable through the use of automated bots.

As a result, contact centers are increasingly relying on automated processes or robots or, as referred to herein, "bots" to interact with customers, with automated chat modules or "chatbots" becoming one of the preferred ways of doing this. One of the benefits of utilizing such chatbots is that it allows contact centers to target the use of human agents for more difficult customer interactions. As will be seen, embodiments of the present invention are directed to systems and methods for orchestrating and integrating bots and/or chatbots into enterprise websites. More specifically, according to certain embodiments, the present invention includes systems and methods for facilitating bot communications via a common cloud-implemented gateway.

Referring now to FIG. 1, a block diagram is presented that illustrates an embodiment of a communication infrastructure or contact center system in accordance with the present invention, which is referred to as a contact center 100. The contact center 100 may be used generally to provide various types of contact center services. As will be seen, aspects of the contact center 100 may be used to engage and manage chat conversations in which automated chat robots or bots and/or human agents communicate with customers or other end users. As will be appreciated, the contact center 100 may be used as an in-house facility to a business or enterprise for serving the enterprise in performing the functions of sales and service relative to the products and services available through the enterprise. In another aspect, the contact center 100 may be operated by a third-party service provider. According to another embodiment, the contact center 100 may operate as a hybrid system in which some components are hosted at the contact center premise while other components are hosted remotely (e.g., in a cloud-based environment). The contact center 100 may be deployed on equipment dedicated to the enterprise or third-party service provider, and/or deployed in a remote computing environment such as, for example, a private or public cloud environment with infrastructure for supporting multiple contact centers for multiple enterprises. As discussed more below, the contact center may include software applications or programs, which may be executed on premises or remotely or some combination thereof. It should further be appreciated that the various components of the contact center may also be distributed across various geographic locations and computing environments and not necessarily contained in a single location, computing environment, or even computing device.

In accordance with the exemplary embodiment of FIG. 1, the components or modules of the contact center 100 may include: a plurality of customer devices 105A, 105B, 105C; a communications network 110 (also referred to simply as network 110); a switch/media gateway 115; a call controller 120; an interactive media response (IMR) server 125; a routing server 130; a storage device 135; a statistics or stat server 140; a plurality of agent devices 145A, 145B, 145C that include workbins 146A, 146B, 146C, respectively; a multimedia/social media server 150; a knowledge management server 152 coupled to a knowledge system 154; a chat server 155, web servers 158; an interaction (iXn) server 160; a universal contact server (UCS) 165; a reporting server 170; and media services 175. As will be seen, the contact center 100 manages resources (e.g., personnel, computers, telecommunication equipment, etc.) to enable delivery of services via telephone, email, chat, or other communication mechanisms. Such services may vary depending on the type of contact center and range from customer service to help desk, emergency response, telemarketing, order taking, etc.

For example, in accordance with an embodiment, customers or other end users desiring to receive services from the contact center 100 initiate inbound communications (e.g., telephony calls, emails, chats, etc.) to the contact center 100 via a customer device 105. While FIG. 1 shows three such customer devices—i.e., customer devices 105A, 105B, and 105C—it should be understood that any number may be present. Each of the customer devices 105 may be a communication device conventional in the art, such as a telephone, wireless phone, smart phone, personal computer, electronic tablet, or laptop, to name some non-limiting examples. In general, the customer devices 105 are used by customers to initiate, manage, and respond to telephone calls, emails, chats, text messages, web-browsing sessions, and other multi-media transactions in accordance with any of the functionality described herein. For example, a customer may use a customer device 105 to contact the contact center 100 by way of a chat channel with the text being transmitted to a chatbot or human agent. A response from the chatbot or human agent may be generated and delivered to the customer device 105 as text.

Inbound and outbound communications from and to the customer devices 105 may traverse the network 110, with the nature of network depending on the type of customer device being used and form of communication. As an example, the network 110 may include a communication network of telephone, cellular, and/or data services and may also comprise a private or public switched telephone network (PSTN), local area network (LAN), private wide area network (WAN), and/or public WAN such as the Internet. The network 110 may also include a wireless carrier network including a code division multiple access (CDMA) network, global system for mobile communications (GSM) network, or any wireless network/technology conventional in the art, including but not limited to 3G, 4G, LTE, etc.

Embodiments of the contact center 100 may include a switch/media gateway 115 coupled to the network 110 for receiving and transmitting telephony calls between the customers and the contact center 100. The switch/media gateway 115 may include a telephone switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection between the calling customer and the agent telephony device, by establishing, for example, a connection between the customer's telephony device and the agent telephony device.

In an embodiment, the switch is coupled to a call controller 120 which, for example, serves as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In an embodiment, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the call center system 100 in processing the interaction.

Embodiments of the contact center 100 may include an interactive media response (IMR) server 125. The IMR server 125 may also be referred to as a self-help system, a virtual assistant, etc. The IMR server 125 may be similar to an interactive voice response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center 100 resource.

For example, if the communication is to be routed to an agent, the call controller 120 may interacts with the routing server (also referred to as an orchestration server) 130 to find an appropriate agent for processing the interaction with the particular customer. The selection of an appropriate agent for routing an inbound customer interaction may be based, for example, on a routing strategy employed by the routing server 130, and further based on stored information about the customer and agents (which, as described more below, may be maintained in customer and agent databases on the storage device 135) and other routing parameters provided, for example, by the statistics server 140, which aggregates data relating to the performance of the call center 100. The routing server 130, for example, may query such data via an ANI. Thus, in general, the routing server 130 may query data relevant to an incoming interaction for facilitating the routing of that interaction to the most appropriate contact center.

Regarding data storage, the contact center 100 may include one or more mass storage devices—represented generally by the storage device 135—that stores one or more databases of data deemed relevant to the functioning of the contact center 100. For example, the storage device 135 may store customer data that is maintained in a customer database (also CDB) 137. Customer data may include customer profiles, contact information, service level agreement (SLA), interaction history (e.g., details of each previous interaction with a customer, including nature of previous customer contacts, reason for the interaction, disposition data, wait time, handle time, and actions taken by the contact center to resolve customer issues). As another example, the storage device 135 may store agent data in an agent database (also ADB) 138. Agent data may include agent availability, profiles, schedules, skills, etc. More generally, it should be understood that, unless otherwise specified, the storage device 135 is configured to include databases and/or store data related to any of the types of information described herein, with those databases and/or data being accessible to the other modules or servers of the contact center 100 in ways that facilitate the functionality described herein. For example, the servers or modules of the contact center 100 may query the databases for retrieving particular data stored therewithin as well as transfer data to the databases for storage thereon. The storage device 135, for example, may take the form of a hard disk, disk array, or any other storage medium as is conventional in the art. The storage device 135 may be included as part of the contact center 100 or operated remotely by a third party. The databases, for example, may be Cassandra or any NoSQL database. The databases may also be a SQL database and be managed by any database management system, such as, for example, Oracle, IBM DB2, Microsoft SQL server, Microsoft Access, PostgreSQL, etc., to name a few non-limiting examples.

In an embodiment, the agent devices 145 are configured to interact with the various components and modules of the call center 100 in ways that facilitate the functionality described herein. For example, the agent devices 145 may include a telephone adapted for regular telephone calls, VoIP calls, etc. The agent device 145 may further include a computer for communicating with one or more servers of the contact center 100 and performing data processing associated with contact center operations, as well as for interfacing with customers via voice and other multimedia communication mechanisms pursuant to described functionality. While FIG. 1 shows three such agent devices—i.e., agent devices 145A, 145B and 145C—it should be understood that any number may be present.

Once it is determined that an inbound communication should be handled by a human agent, functionality within the routing server 130 may select an agent from those available for routing the communication thereto. As already discussed, this selection may be based on which agent is best suited for handling the inbound communication. Once the appropriate agent is selected, the contact center 100 forms a connection between the customer device 105 and the agent device 145 that corresponds to the selected agent. As part of this connection, information about the customer and/or the customer's history may be provided to the selected agent via his/her agent device 145. This information generally includes data that may aid the selected agent to better service the customer.

According to an embodiment, the contact center 100 may include a multimedia/social media server 150 for engaging in media interactions other than voice interactions with the customer devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

Embodiments of the contact center 100 may include a knowledge management server 152 for facilitating interactions between customers operating the customer devices 105 and a knowledge system 154. The knowledge system 154 may be included as part of the contact center 100 or operated remotely by a third party. In general, the knowledge system 154 may be a computer system capable of receiving questions or queries and providing answers in response. The knowledge system 154 may include an artificially intelligent computer system capable of answering questions posed in natural language by retrieving information from information sources such as encyclopedias, dictionaries, newswire articles, literary works, or other documents submitted to the knowledge system 154 as reference materials, as is known in the art. As an example, the knowledge system 154 may be embodied as IBM Watson®, though other types of systems also may be used. Additional details of the knowledge management server and knowledge system are provided in U.S. application Ser. No. 14/449,018, filed on Jul. 31, 2014, entitled "System and Method for Controlled Knowledge System Management," the content of which is incorporated herein by reference.

According to an embodiment, the contact center 100 may include a chat server 155 for conducting and managing electronic chat communications with customers operating customer devices 105. As will be seen, chat communications may be conducted by the chat server 155 in such a way that a customer communicates with both automated systems, which may also be referred to as chatbots, as well as human agents, which may also be referred to simply as agents. According to an embodiment, the chat server 155 may be configured to implement and maintain chat conversations, generate chat transcripts, and determine whether a chat communication is completed (e.g., based on timeout or by a customer closing a chat window). In an embodiment, the chat server 155 may also operate as a chat orchestration server, dispatching actual chat conversations among the chatbots or available human agents. The processing logic of the chat server 155 may be rules driven, and leverage, for example, intelligent workload distribution protocols and various business rules for routing communications. The chat server 155 further may implement, manage and facilitate user interfaces (also UIs) associated with the chat feature, including those UIs generated at either the customer device 105 or the agent device 145. Further, the chat server 155 may orchestrate and implement chats conducted by both human agents and automated chatbots. According to an embodiment, the chat server 155 is configured to transfer chats within a single chat session with a particular customer between automated and human sources such that, for example, a chat session transfers from a chatbot to a human agent or from a human agent to a chatbot.

The chat server 155 may also be coupled to the knowledge management server 152 and the knowledge systems 154 for receiving suggestions and answers to queries posed by customers during an automated chat, providing links to knowledge articles, or the like. Additionally, the chat server 155 may be configured to facilitate (e.g., supervise and coordinate) self-learning by certain of the chatbots. For example, prior to characteristics of individual chatbots being modified, the chat server 155 may determine whether the feedback from customer that precipitated the modification is suspicious or malicious (e.g., by searching for or identifying key words or phrases, and/or flagging potential issues for review by an agent). Although the chat server 155 is depicted in the embodiment of FIG. 1 as being a separate server component, a person of skill in the art should recognize that functionalities of the chat server 155 may be incorporated into other servers, such as, for example, the multimedia/social media server 150 or the IMR server 125.

According to an embodiment, the web servers 155 may include social interaction site hosts for a variety of known social interaction sites to which a customer may subscribe, such as Facebook, Twitter, Instagram, etc., to name a few non-limiting examples. In an embodiment, although web servers 155 are depicted as part of the contact center 100, the web servers 155 may also be provided by third parties and/or maintained outside of the contact center premise. The web servers 155 may also provide web pages for the enterprise that is being supported by the contact center 100. Customers may browse the web pages and get information about the enterprise's products and services.

The web pages may also provide a mechanism for contacting the contact center via, for example, web chat, voice call, email, web real-time communication (WebRTC), etc. For example, widgets may be deployed on the websites hosted on the web servers 155. As used herein, a widget refers to a user interface component that performs some particular function. In some implementations, a widget may include a graphical user interface control that can be overlaid on a web page displayed on the Internet. The widget may show information, such as in a window or text box, and/or include buttons or other controls that allow the user to access certain functionalities such as sharing or opening a file. In some implementations, a widget is a common looking user interface component having a portable portion of code that can be installed and executed within a separate web-based page without compilation. Some components can include corresponding and/or additional user interfaces and can access a variety of resources such as local resources (e.g., a calendar, contact information, etc. on the user device) and/or remote/network resources (e.g., instant messaging, electronic mail, social networking updates, etc.).

In addition, embodiments of the call center 100 may be configured to manage deferrable interactions or activities (also referenced simply as deferrable activities) and the routing thereof to human agents for completion. As should be understood, deferrable activities include back-office work that can be performed off-line, examples of which include responding to emails, letters, attending training, and other activities that do not entail real-time communication with a customer. To do this, the interaction (iXn) server 160 is configured to interact with the routing server 130 for selecting an appropriate agent to handle each of the deferable activities. Once assigned to a particular agent, the deferable activity is pushed to that agent, for example, appearing on the agent device 145 of the selected agent. As an example, the deferable activity appear in a workbin 146 as a task for the selected agent to complete. The functionality of the workbin 146 may be implemented via any conventional data structure, such as, for example, a linked list, array, etc. Each of the agent devices 145 may include a workbin 146, thus, workbins 146A, 146B, and 146C may be maintained in the agent devices 145A, 145B, and 145C, respectively. As an example, a workbin 146 may be maintained in the buffer memory of the corresponding agent device 145.

According to an embodiment, the contact center 100 may include a universal contact server (UCS) 165, which is configured to retrieve information stored in the customer database 137 and direct information for storage therein. For example, the UCS 165 may be utilized as part of the chat feature to facilitate maintaining a history on how well chats for a particular customer were handled, which then may be used as a reference for future chat communications. The UCS 165 also may be configured to facilitate maintaining a history of customers' preferences regarding media channels, such as instances in which chat communications are acceptable and instances in which customers prefer alternate media channels. Additionally, the UCS 165 may be configured to record an interaction history for each customer, capturing and storing data regarding comments from agents, customer communication history, and the like. Each of these data types may be stored on the customer database 137 or on other modules as described functionality requires.

Example embodiments of the contact center 100 may further include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent, administrator, contact center application, etc.).

According to an embodiment, the media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

The various components, modules, and/or servers of FIG. 1 (as well as the other figures included herein) may each include one or more processors executing computer program instructions and interacting with other system components for performing the various functionalities described herein. The computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention. Further, the terms "interaction" and "communication" are used interchangeably, and generally refer to any real-time and non-real-time interaction that uses any communication channel including, without limitation, telephony calls (PSTN or VoIP calls), emails, vmails, video, chat, screen-sharing, text messages, social media messages, WebRTC calls, etc. Access to and control of the components of the contact system 100 may be affected through user interfaces (UIs) which may be generated on the customer devices 105 and/or the agent devices 145. As noted above, the contact center 100 may operate as a hybrid system in which some or all components are hosted remotely, such as in a cloud-based environment. For the sake of convenience, aspects of embodiments of the present invention may be described herein with respect to providing modular tools from a cloud-based environment to components housed on-premises.

Figure 2:
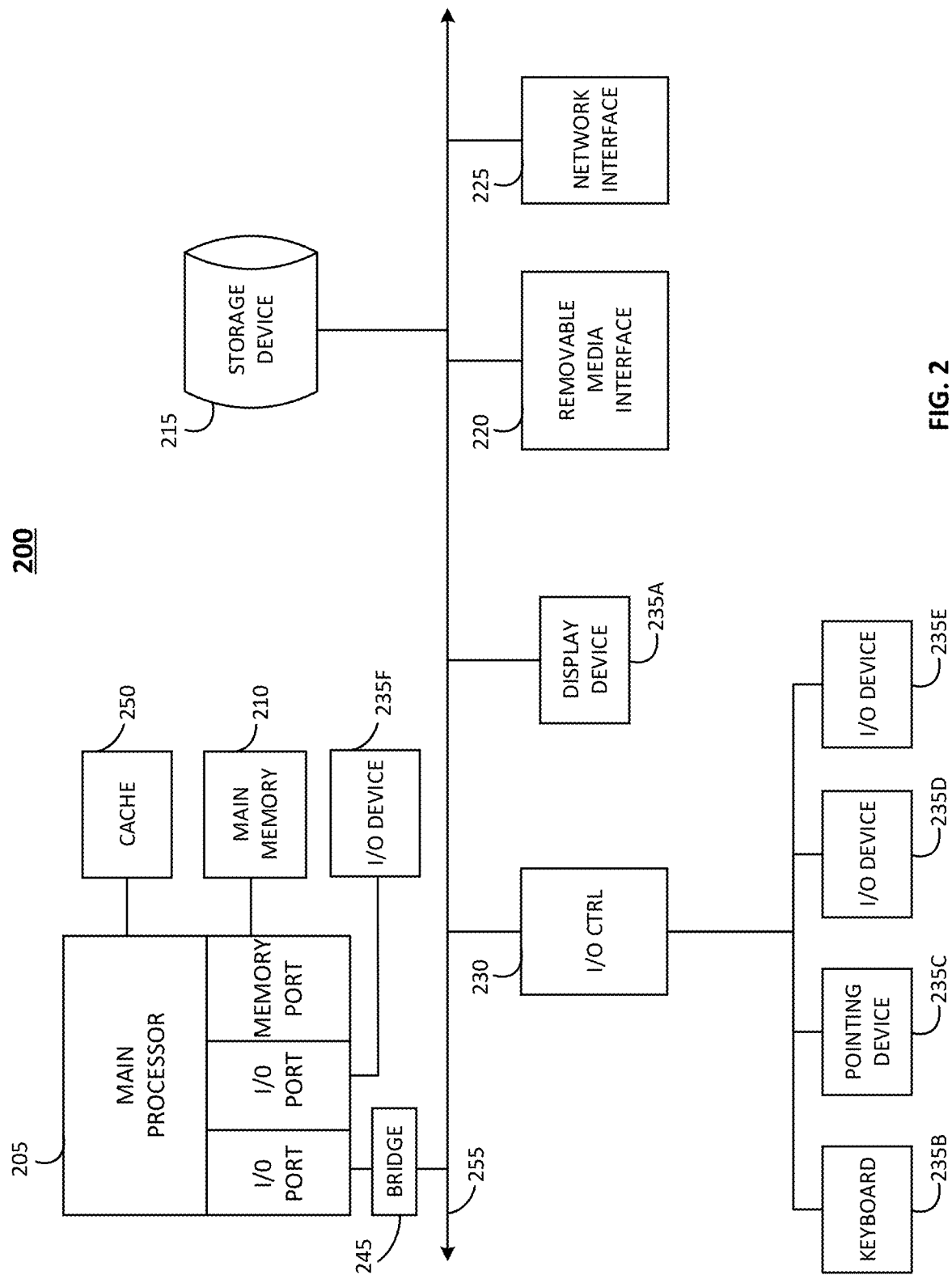
FIG. 2 is a block diagram of a computing device according to embodiments of the present invention.

Turning now to FIG. 2, an exemplary computing device is shown that may be used to implement aspects of the present invention. As should be appreciated by a person of skill in the art, each of the various servers, controls, switches, gateways, engines, and/or modules (collectively referred to also as servers) in the described figures may be implemented via hardware or firmware (e.g., ASIC). Each of the various servers may be a process or thread, running on one or more processors, in one or more computing devices, such as, for example, the computing device 200 of FIG. 2, executing computer program instructions and interacting with other system components for performing the various functionalities described herein. A person of skill in the art should recognize that a computing device may be implemented via firmware (e.g., an application-specific integrated circuit), hardware, or a combination of software, firmware, and hardware. Further, it should be appreciated that, without departing from the scope of the example embodiments of the present invention, the functionality of various computing devices may be combined or integrated into a single computing device, or the functionality of a particular computing device may be distributed across one or more other computing devices. A server may be a software module, which may also simply be referred to as a module. For example, a module of the contact center 100 may include one or more of the included servers.

Further, the various servers may be located on a computing device on-site at the same physical location as the agents of the contact center or may be located off-site (or in the cloud) in a geographically different location, e.g., in a remote data center, connected to the contact center via a network such as the Internet. Some of the servers may be located in a computing device on-site at the contact center while others may be located in a computing device off-site, or servers providing redundant functionality may be provided both via on-site and off-site computing devices to provide greater fault tolerance. In an embodiment, functionality provided by servers located on computing devices off-site may be accessed and provided over a virtual private network (VPN) as if such servers were on-site, or the functionality may be provided using a software as a service (SaaS) to provide functionality over the Internet using various protocols, such as by exchanging data using encoded in extensible markup language (XML) or JSON.

With specific reference now to FIG. 2, a diagram is provided that illustrates an exemplary embodiment of a computing device 200 as may be employed in embodiments of the present invention. The computing device 200 may include a main processor or CPU 205 and a main memory unit 210. The computing device 200 may also include a storage device 215, a removable media interface 220, and a network interface 225. The computing device 200 may include one or more input/output (I/O) devices 235, which in the embodiment shown includes an I/O controller 230, a display device 235A, a keyboard 235B, and a pointing device 235C (e.g., a mouse). The storage device 215 may include, without limitation, storage for an operating system and software. The computing device 200 may also include additional optional elements, such as a memory port 240, a bridge 245, one or more additional input/output devices 235D, 235E, 235F and a cache memory 250 in communication with the CPU 205.

The CPU 205 is any logic circuitry that responds to and processes instructions fetched from the main memory unit 210. It may be implemented, for example, in an integrated circuit, in the form of a microprocessor, microcontroller, or graphics processing unit, or in a field-programmable gate array (FPGA) or application-specific integrated circuit (ASIC). The main memory unit 210 may be one or more memory chips capable of storing data and allowing any storage location to be directly accessed by the central processing unit 205. Though other configurations are possible, as shown in the illustrated example, the central processing unit 205 may communicate directly with the main memory 210 via a memory port 240 and indirectly with the storage device 215 via a system bus 255.

In an embodiment, the CPU 205 may include a plurality of processors and may provide functionality for simultaneous execution of instructions or for simultaneous execution of one instruction on more than one piece of data. In an embodiment, the computing device 200 may include a parallel processor with one or more cores. In an embodiment, the computing device 200 comprises a shared memory parallel device, with multiple processors and/or multiple processor cores, accessing all available memory as a single global address space. In another embodiment, the computing device 200 is a distributed memory parallel device with multiple processors each accessing local memory only. The computing device 200 may have both some memory which is shared and some which may only be accessed by particular processors or subsets of processors. The CPU 205 may include a multicore microprocessor, which combines two or more independent processors into a single package, e.g., into a single integrated circuit (IC). For example, the computing device 200 may include at least one CPU 205 and at least one graphics processing unit.

In an embodiment, a CPU 205 provides single instruction multiple data (SIMD) functionality, e.g., execution of a single instruction simultaneously on multiple pieces of data. In another embodiment, several processors in the CPU 205 may provide functionality for execution of multiple instructions simultaneously on multiple pieces of data (MIMD). The CPU 205 may also use any combination of SIMD and MIMD cores in a single device.

FIG. 2 depicts an embodiment in which the CPU 205 communicates directly with cache memory 250 via a secondary bus, sometimes referred to as a backside bus. In other embodiments, the CPU 205 communicates with the cache memory 250 using the system bus 255. The cache memory 250 typically has a faster response time than main memory 210. As illustrated, the CPU 205 communicates with various I/O devices 235 via the local system bus 255. Various buses may be used as the local system bus 255 in accordance with conventional technology. For embodiments in which an I/O device is a display device 235A, the CPU 205 may communicate with the display device 235A through an advanced graphics port (AGP). As further shown, the CPU 205 may communicate directly with I/O device 235F. Though other configurations are possible, FIG. 2 depicts an embodiment in which local buses and direct communication are mixed: the CPU 205 communicates with I/O device 235E directly while communicating with the other IO devices 235 via a local system bus 255.

A wide variety of I/O devices 235 may be present in the computing device 200. Input devices include one or more keyboards 235, mice, trackpads, trackballs, microphones, and drawing tables, to name a few non-limiting examples. Output devices include video display devices, speakers and printers. An I/O controller 230 may be used to control the one or more I/O devices, such as a keyboard 235B and a pointing device 235C (e.g., a mouse or optical pen), for example.

As illustrated, the computing device 200 may support one or more removable media interfaces 220, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. The removable media interface 220 may, for example, be used for installing software and programs. The computing device 200 may further include a storage device 215, such as one or more hard disk drives or hard disk drive arrays, for storing an operating system and other related software, and for storing application software programs. Optionally, a removable media interface 220 may also be used as the storage device. For example, the operating system and the software may be run from a bootable medium, for example, a bootable CD.

In an embodiment, the computing device 200 may include or be connected to multiple display devices 235A. As such, any of the I/O devices 235 and/or the I/O controller 230 may include any type and/or form of suitable hardware, software, or combination of hardware and software to support, enable or provide for the connection to, and use of, the multiple display devices 235A by the computing device 200. For example, the computing device 200 may include any type and/or form of video adapter, video card, driver, and/or library to interface, communicate, connect or otherwise use the multiple display devices 235A. In an embodiment, a video adapter may include multiple connectors to interface to multiple display devices 235A. In another embodiment, the computing device 200 may include multiple video adapters, with each video adapter connected to one or more of the display devices 235A. In other embodiments, one or more of the display devices 235A may be provided by one or more other computing devices, connected, for example, to the computing device 200 via a network. These embodiments may include any type of software designed and constructed to use the display device of another computing device as a second display device 235A for the computing device 200. One of ordinary skill in the art will recognize and appreciate the various ways and embodiments that a computing device 200 may be configured to have multiple display devices 235A.

An embodiment of a computing device indicated generally in FIG. 2 may operate under the control of an operating system, which controls scheduling of tasks and access to system resources. The computing device 200 may be running any operating system, any embedded operating system, any real-time operating system, any open source operation system, any proprietary operating system, any operating systems for mobile computing devices, or any other operating system capable of running on the computing device and performing the operations described herein. The computing device 200 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In an embodiment, the computing device 200 may have different processors, operating systems, and input devices consistent with the device. In other embodiments, the computing device 200 is a mobile device. Examples might include a Java-enabled cellular telephone or personal digital assistant (PDA), a smart phone, a digital audio player, or a portable media player. In an embodiment, the computing device 200 includes a combination of devices, such as a mobile phone combined with a digital audio player or portable media player.

The computing device 200 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 200 communicates with other computing devices 200 via any type and/or form of gateway or tunneling protocol such as secure socket layer (SSL) or transport layer security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines. Other types of virtualization are also contemplated, such as, for example, the network (e.g., via software defined networking (SDN)). Functions, such as functions of session border controller and other types of functions, may also be virtualized, such as, for example, via network functions virtualization (NFV).

Figure 3:
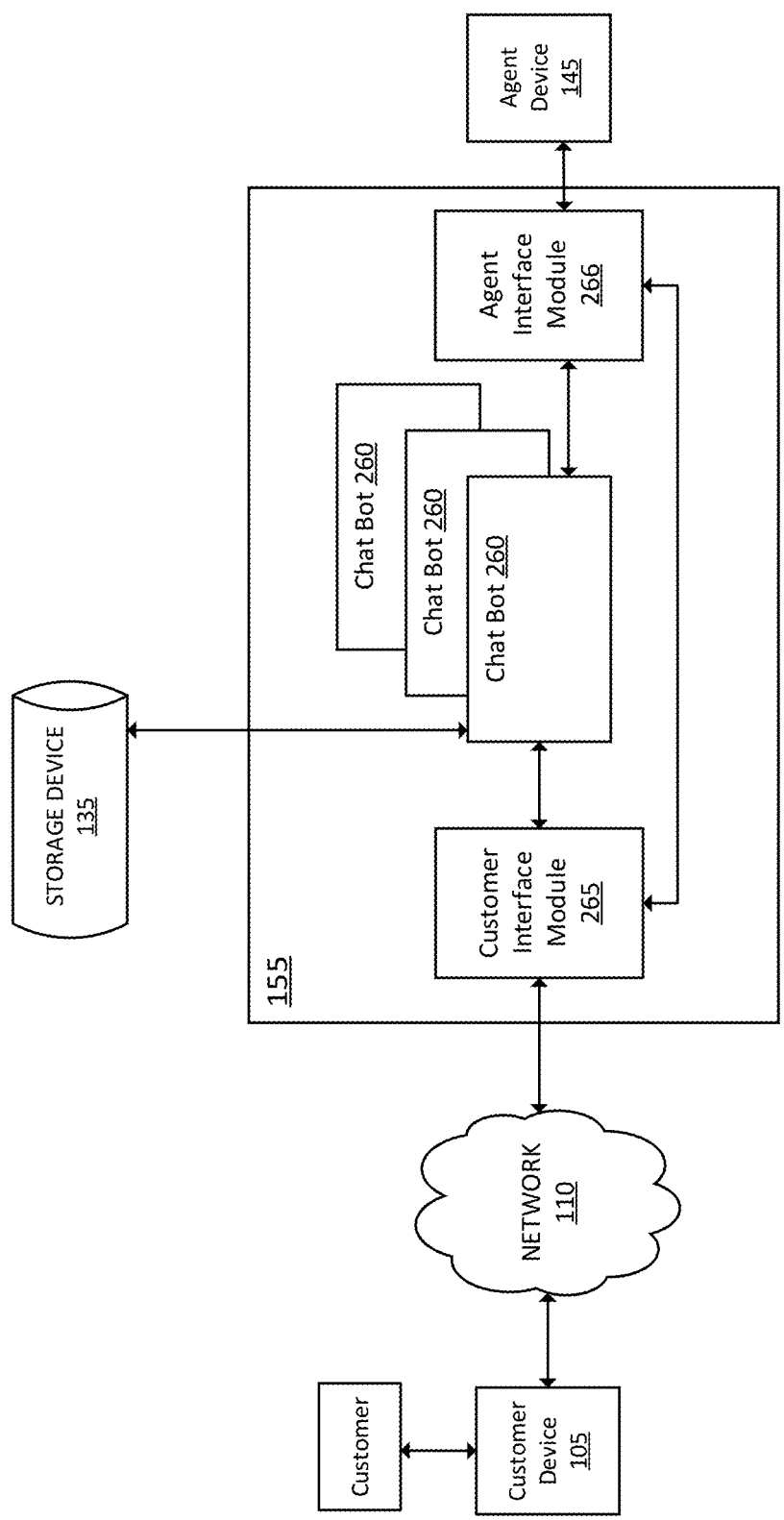
FIG. 3 is schematic block diagram showing further details of a chat server operating as part of the chat system according to embodiments of the present invention.
Figure 4:
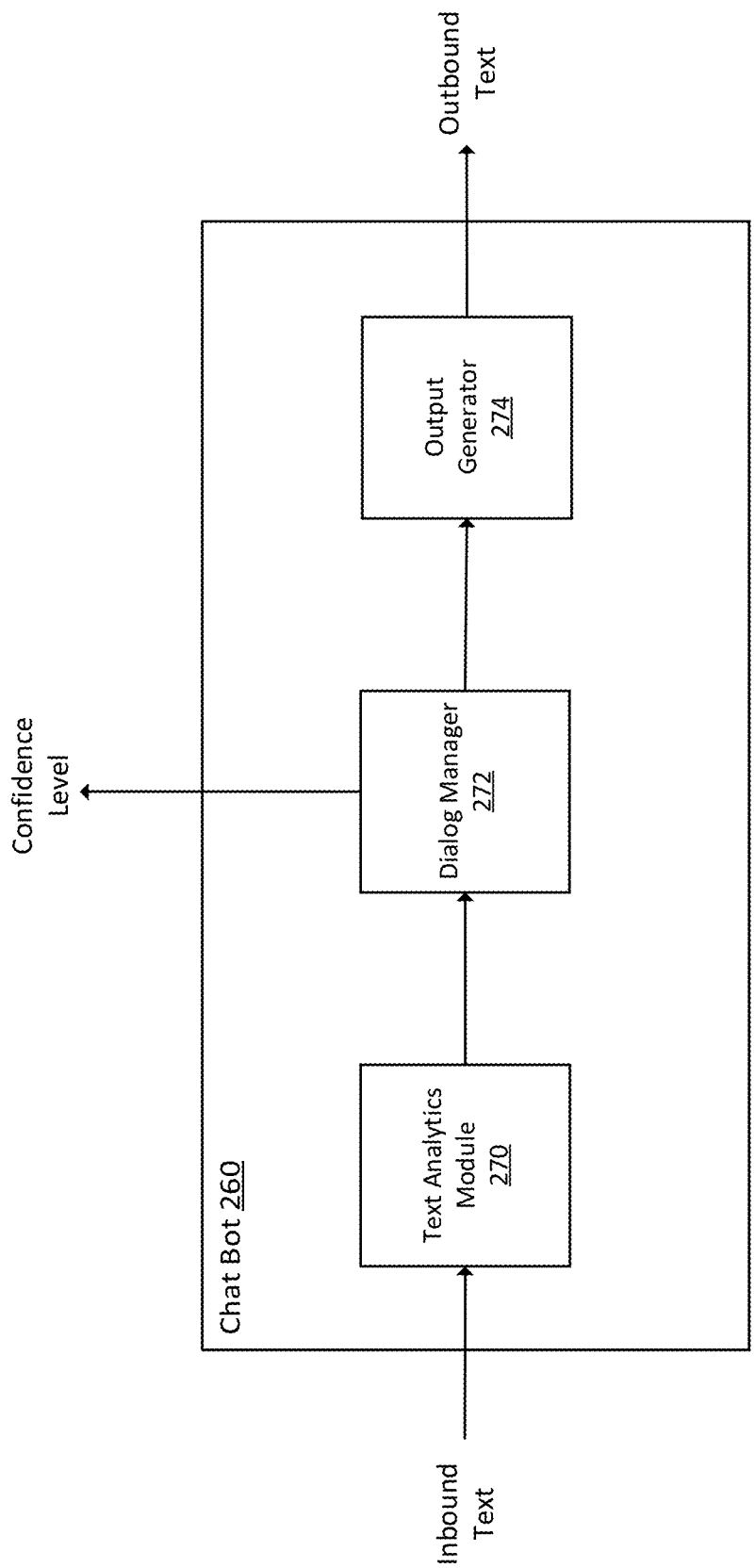
FIG. 4 is a schematic block diagram of a chat module according to embodiments of the present invention.

Turning to FIGS. 3 and 4, for background purposes, an exemplary implementation of a chat server and chatbot are presented. As would be understood by one skilled in the art, the systems and methods described in relation to FIGS. 3 and 4 may be used or modified for use in embodiments of the present invention. Such modifications, for example, may include the implementation of certain aspects of the system via a cloud or serverless architecture—consistent with the systems described in relation to FIGS. 5-8 and the stated functionality, as would be in the purview of one of ordinary skill in the relevant technical fields.

Referring specifically now to FIG. 3, a more detailed schematic block diagram is provided of the chat server 155. As stated above, FIG. 3 is provided for background purposes and as an exemplary implementation of a chat server. As would be appreciated by one of ordinary skill in the art, aspects of the chat server 155 may be used or modified for use with embodiments of the present invention, as provided in relation to FIGS. 5-8. As already described, the chat server 155 may be coupled to (e.g., in electronic communication with) a customer device 105 operated by the customer over a data communications network 110. The chat server 155 may be operated by a business or enterprise as part of a contact center 100 (e.g., FIG. 1) for implementing and orchestrating aspects of chat conversations with the customers of the business, including both automated chats and chats with human agents. In regard to automated chats, the chat server 155 may host one or more chat automation modules or chatbots 205A-205C (collectively referenced as 205), which are configured with computer program instructions for engaging in automated chat conversations. Thus, generally, the chat server 155 implements chat functionality, including the exchange of text-based or chat communications between a customer device 105 and an agent device 145 as well as between a customer device 105 and a chatbot 260. As will be discussed more below, the chat server 155 may include a customer interface module 265 and an agent interface module 266 for generating particular UIs at the customer device 105 and the agent device 145, respectively, that are included within the chat functionality.

The chatbots 205 may operate, for example, as an executable program that can be launched according to demand for the particular chatbot. According to an embodiment, the chat server 155 may operate as an execution engine or environment for the chatbots 205, analogous to loading VoiceXML files to a media server for interactive voice response (IVR) functionality. Loading and unloading may be controlled by the chat server 155, analogous to how a VoiceXML script may be controlled in the context of an interactive voice response. The chat server 155 may provide a means for capturing and collecting user data in a unified way, similar to user data capturing in the context of IVR. Such data can be stored (e.g., in the CMR database), shared, and utilized in follow-up conversation steps, whether with the same chatbot, a different chatbot, an agent chat, or even a different media type. According to an embodiment, the chat server 155 is configured to orchestrate the sharing of data among the various chatbots 205 as interactions are transferred or transitioned over from one chatbot to another or from one chatbot to a human agent. According to an embodiment, the data captured during interaction with a particular chatbot may be transferred along with a request to invoke a second chatbot or human agent.

In an embodiment, the number of chatbots 205 may vary according to the design and function of the chat server 155 and is not limited to the number illustrated in FIG. 3. For example, different chatbots may be created to have different profiles. The profile of a particular chatbot may be used to select a chatbot with expertise for helping a customer on a particular subject control, for example, how the chatbot communicates with a particular customer. Engaging chatbots with profiles that are catered to specific types of customers may allow more effective communication with such users. For example, one chatbot may be designed or specialized to engage in a first topic of communication (e.g., opening a new account with the business 104), while another chatbot may be designed or specialized to engage in a second topic of communication (e.g., technical support for a product or service provided by the business 104), that is different from the first topic of communication. In another example, the chatbots may be configured to utilize different dialects or slang or may have different personality traits or characteristics. For example, the vocabulary of the different chatbots may be tailored to use the slang or diction of young people, elder people, people in a certain region of the country, and/or people having a certain language or ethnic background. The chat server 155 may also host a default chatbot that may be invoked at a beginning of a chat conversation if there is insufficient information about the customer to invoke a more specialized chatbot. For example, if a customer intent is unknown when the conversation initially ensues, the default chatbot may be invoked to ask questions about the customer intent. According to an embodiment, a chatbot may be customer selectable, for example, based on accent, appearance, age group, language, etc., by way of a user interface. Additionally, a chatbot may be assigned to a customer based on demographic information of the customer. According to an embodiment, a chatbot profile may be selected based on information learned from publicly available information (e.g., social media information) about a customer.

According to an embodiment, a profile of a chatbot 260 may be stored in a profile database hosted in the storage device 135. The chatbot's profile data may include, without limitation, the chatbot's personality, gender, demographics, areas of expertise, and the like. According to an embodiment, for a given subject, including receptionist and concierge services, and specialists on particular products or services (e.g., travel booking, opening accounts, etc.), there may be several different chatbots 205, each with their own personality or profile.

Each of the different chatbots 205 may be configured, in conjunction with the chat server 155, to learn and evolve their behavior and responses according to input by the customers. For example, in response to users reacting negatively to certain words, phrases, or responses, the chatbots 205 may learn to use different words, phrases, or responses. Such learning may be supervised in order to prevent undesired evolution of the personalities or profiles of the chatbots 205. For example, changes to the personalities or profiles of the chatbots 205 may be first approved or validated by human supervisors, certain keywords or phrases may be identified or flagged, and customer feedback may be analyzed. According to an embodiment, different chatbots 205 may be configured to learn from each other, in addition to learning based on customer feedback or agent feedback. For example, different chatbots 205 may be configured to communicate and exchange data with each other. In an embodiment, the different chatbots 205 may operate as a neural network for deep learning and self-learning capabilities, by exchanging data with one another.

As mentioned, the chat server 155 may include a customer interface module 265 and an agent interface module 266. As described more below, the customer interface module 265 may be configured to generating user interfaces (UIs) for display on the customer device 105 that facilitate chat communication between the customer and the chatbots 205 and the customer and human agents. The chat server 155 may include an agent interface module 266 for generating particular UIs on the agent device 145 that facilitate chat communication between an agent operating an agent device 145 and a customer operating a customer device 105. The agent interface module 266 may also generate UIs on the agent device 145 that allow an agent to monitor aspects of an ongoing chat between a chatbot 260 and a customer. The customer interface module 265 and the agent interface module 266, thus, may operate to facilitate the exchange of chat communications between the customer device 105 and one of the chatbots 205 and/or one of the agent devices 145. For example, the customer interface module 265 may transmit signals to the customer device 105 during a chat session that are configured to generated particular UIs on the customer device 105. As will be seen, those UIs generated on the customer device 105 may include the text messages sent from chatbots 205 or human agents as well as other non-text graphics that are intended to accompany the text messages, such as, emoticons or animations, for display therewith. Likewise, the agent interface module 266 may transmit signals to the agent device 145 during a chat session that are configured to generated particular UIs on the agent device 145. As will be seen, those UIs generated on the agent device 145 may include the text messages sent from customer device 105. The UIs generated on the agent device 145 also may include an interface that facilitates the selection of non-text graphics by the agent that are to accompany an outgoing text message to the customer.

According to an embodiment, the chat server 155 may be implemented in a layered architecture, with a media layer, a media control layer, and the chatbots executed by way of the IMR server 125 (similar to executing a VoiceXML on an IVR media server).

As depicted in FIG. 1, the chat server 155 may further be configured to interact with the knowledge management server 152 to query the server for knowledge information. The query, for example, may be based on a question received from the customer during a chat. Responses received from the knowledge management server 152 may then be provided to the customer as part of a chat response.

According to an embodiment, the chat server 155 may run on the same computer as the other servers of the contact center 100 depicted in FIG. 1. The chat server 155 may also run on a separate computer equipped with a processor or central processing unit (CPU) (such as that shown in FIG. 2), which executes program instructions and interacts with other system components to perform various methods and operations according to embodiments of the present invention. The chat server 155 may also run on the cloud or serverless architecture. The chat server 155 may include a memory, which operates as an addressable memory unit for storing software instructions to be executed by the CPU. The memory may be implemented using any suitable memory device, such as a random access memory (RAM), and may additionally operate as a computer readable storage medium having non-transitory computer readable instructions stored therein that, when executed by the processor, cause the processor to control and manage an automated chat communication between the chat server 155, the customer device 105, and/or the agent device 145.

Referring specifically now to FIG. 4, a more detailed block diagram is provided of an exemplary chat automation module or chatbot 260. As stated, FIG. 4 is provided for background purposes and as an exemplary implementation of a chatbot. As would be understood by one of ordinary skill in the art, aspects of chatbot 260 may be used or modified for use with embodiments of the present invention. In the illustrated embodiment, the chatbot 260 includes a text analytics module 270, a dialog manager 272, and an output generator 274. The text analytics module is configured to analyze and understand natural language. In this regard, the text analytics module may be configured with a lexicon of the language, a syntactic/semantic parser, and grammar rules for breaking a phrase provided by the customer device 105, into an internal syntactic and semantic representation. According to an embodiment, the configuration of the text analytics module depends on the particular profile associated with the chatbot. For example, certain slang words may be included in the lexicon for one chatbot but excluded from another chatbot.

In operation, the dialog manager 272 receives the syntactic and semantic representation from the text analytics module 270 and manages the general flow of the conversation based on a set of decision rules. In this regard, the dialog manager 272 maintains history and state of the conversation, and generates an outbound communication based on the history and state. The communication may follow the script of a particular conversation path selected by the dialog manager 272. As described in further detail below, the conversation path may be selected based on an understanding of a particular purpose or topic of the conversation. The script for the conversation path may be generated using any of various languages and frameworks conventional in the art, such as, for example, artificial intelligence markup language (AIML), SCXML, or the like.

During the chat conversation, the dialog manager 272 selects a response deemed to be appropriate at the particular point of the conversation flow/script, and outputs the response to the output generator 274. According to an embodiment, the dialog manager 272 may also be configured to compute a confidence level for the selected response and provide the confidence level to the agent device 145. According to an embodiment, every segment, step, or input in a chat communication may have a corresponding list of possible responses. Responses may be categorized based on topics (determined using a suitable text analytics and topic detection scheme) and suggested next actions are assigned.

Actions may include, for example, responses with answers, additional questions, assignment for a human agent to assist (e.g., by disambiguating input from the customer), and the like. The confidence level may be utilized to assist the system with deciding whether the detection, analysis, and response to the customer input is appropriate or sufficient, or whether a human agent should be involved. For example, a threshold confidence level may be assigned to invoke human agent intervention, based on one or more business rules. According to an embodiment, confidence level may be determined based on customer feedback. For example, in response to detecting a negative reaction from a customer to an action or response taken by the chatbot, the confidence level may be reduced. Conversely, in response to detecting a positive reaction from a customer, the confidence level may be increased.

According to an embodiment, the response selected by the dialog manager 272 may include information provided by the knowledge management server 152. The information may be, for example, a link to a knowledge article that the chatbot may want to recommend to the customer in response to a question posed by the customer.

In an embodiment, the output generator 274 takes the semantic representation of the response provided by the dialog manager 272, maps the response to a chatbot profile or personality (e.g., by adjusting the language of the response according to the dialect, vocabulary, or personality of the chatbot), and outputs an outbound text to be displayed at the customer device 105. The output text may be intentionally presented such that the customer interacting with a chatbot is unaware that it is interacting with an automated process as opposed to a human agent. As will be seen, in accordance with other embodiments, the output text may be linked with visual representations, such as emoticons or animations, integrated into the customer's user interface.

Before proceeding with the description of the present invention with respect to FIGS. 5-8, an explanatory note will be provided in regard to referencing system components—e.g., modules, servers, components, and other systems—that have already been introduced in the previous figures. Whether or not a subsequent reference includes the corresponding numerical identifiers of FIGS. 1-4, it should be understood that such reference incorporates the previously discussed examples and, unless otherwise specifically limited, may be implemented in accordance with those examples and/or other conventional technology capable of fulfilling the desired functionality, as would be understood by one of ordinary skill in the art. Thus, for example, subsequent mention of a "contact center" should be understood as referring to the exemplary "contact center 100" of FIG. 1 and/or other conventional technology for implementing a contact center. As additional examples, a subsequent mention below to a "customer device", "storage device", "agent device", "chat server", "computing device", "chatbot", or "customer interface module" should be understood as referring to the exemplary "customer device 105", "storage device 135", "agent device 145", "chat server 155", "computing device 200", "chatbot 260", or "customer interface module 265", respectively, of FIGS. 1-4, as well as conventional technology for fulfilling the same functionality.

Figure 5:
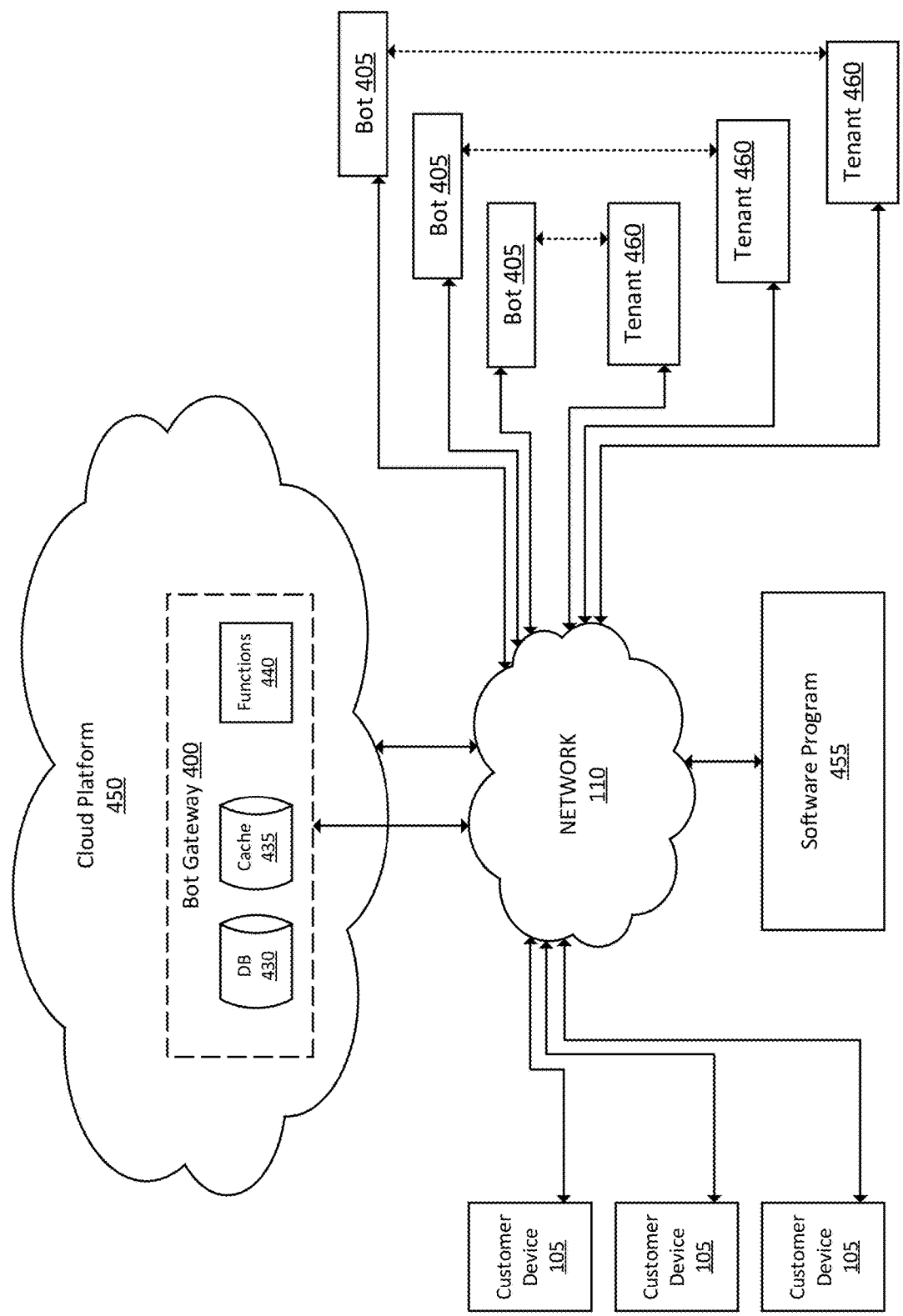
FIG. 5 is a schematic block diagram of a system configuration according to embodiments of the present invention.

With reference now to FIG. 5, an exemplary system configuration is provided that illustrates an environment in which a bot gateway 400 may be used in accordance with embodiments of the present invention. According to one possible arrangement, the bot gateway 400 is configured to facilitate communications between one or more users or customers (via the illustrated customer devices 105) and one or more bots 405, which are also commonly known as automated processes, web robots, or Internet bots. As used herein, a bot is a software application that runs automated tasks or scripts over the Internet, for example, performing tasks that are both simple and structurally repetitive at a much higher rate than would be possible for a human. According to a preferred embodiment, the bots 405 of the present invention include chatbots, for example, the chatbot 260 discussed above. As used herein, a chatbot is defined as a piece of software that conducts a conversation via auditory or textual methods. As will be appreciated, chatbots are often designed to convincingly simulate how a human would behave as a conversational partner. Chatbots are typically used in dialog systems for various practical purposes including customer service or information acquisition. Some chatbots use sophisticated natural language processing systems, but many simpler ones scan for keywords within the input, then pull a reply with the most matching keywords, or the most similar wording pattern, from a database. Chatbots can be classified into usage categories such as conversational commerce (e-commerce via chat), analytics, communication, customer support, social, travel, etc.

Though other types of implementations are also possible, as shown in FIG. 5, the bot gateway 400 may be implemented with a serverless architecture in which one or more cloud components (for example, a cloud database 430, a cloud cache 435, and cloud computing functions 440, which are discussed more below) are maintained and executed within a cloud, i.e., a cloud computing platform, or, as used herein, a cloud platform 450.

In the illustrated example, a software program 455 may be commercially provided to several enterprises or, as used herein, tenants 460. Though not intended as limiting unless stated otherwise, the "tenants" are so named because the software program 455 may be provided to them in a multitenancy arrangement. In such an arrangement, the tenants 460 would have access to and thereby use the software program 455 via a connection over a network 110. In a preferred embodiment, the software program 455 may be one that is used to manage interactions for the enterprises or tenants 460 with respective users or customers. For example, the software program 455 may relate to the field of customer relation management and/or include aspects relating to the operational management of a call or contact center, such as the example contact center discussed above in connection with FIG. 1. Thus, in general, the software program 455 may be configured to facilitate certain interactions or services between the enterprises or tenants 460 and their respective customers. As will be discuss more in relation to FIG. 6, one feature included within the software program 455 may include a chat feature having a user interface that is generated on a screen of the customer devices 105 that facilitates the input of characters or text by a customer. This functionality may allow customers to prepare and send the text messages that are intended for delivery to the bots 405. Though other types of implementation are possible, the chat feature may be implemented by an interactive widget, which generates a chat user interface within a predefined area of a tenant sponsored webpage that is being viewed on the customer device 105.

In the exemplary situation depicted in FIG. 5, the tenants 460 of the software application 455 each may have rights to one or more bots 405, which is represented in FIG. 5 by the dashed lines connecting the bots 405 to respective tenants 460. Such bots 405 may include native bots developed by the tenant 460, third party bots developed for the tenant 460 by a bot provider, partner-built bots, etc. A tenant 460 may wish to make such bots available to its customers, preferably by integrating and making them available within the tenant's customer relations platform, which, in FIG. 5, is represented by the software program 455. In conventional systems, however, this would require considerable integration and maintenance costs. From the perspective of the tenant 460, it would be highly desirable if a bot orchestration service were available for flexibly engaging such bots at a high-level and without requiring specific bot provider knowledge. It will be appreciated that, if such services were available, a tenant's resources may be more fully utilized, while still avoiding costly integration and maintenance efforts.

To address this situation, the bot gateway 400 of the present invention provides a unified interface for accessing different bots from various bot providers. The bot gateway 400, in general, reconciles the differences between bots and bot providers, while also supporting specific feature sets that makes the different bots and bot providers desirably unique. As will be seen, the bot gateway 400 achieves this in a manner that can be maintain efficiently. Whereas conventional systems would require API updates and complex integrations whenever bot providers add new features or make API changes to their bots, the bot gateway 400 is set up so that these are unnecessary. As discussed in detail below, the bot gateway 400 achieves this by implementing context according to a schema definition that describes how to communicate with the different bots. By providing this level of indirection, the implementation context can be abstracted away to a JSON schema-compliant object applicable for bot, dialog, administration, or querying (intents, entities, contexts) use cases. Further, the bot gateway 400 of the present invention does not require code changes to add new bot providers. Instead the bot gateway 400 may be implemented using a REST-based schema approach for seamless partner, customer, vendor, or bot provider integration. As will be appreciated, for customer relationship platforms focused on delivering an omnichannel customer journey where text-based interactions occur across many channels, having the ability to orchestrate bot flows naturally within queues, workgroups, or another such mechanism represents a significant operational advantage. The bot gateway 400 provides this type of functionality, thereby removing limitations that otherwise prevented the efficient integration of bots into the customer experience.

One way in which this may be achieved is through implementation of the bot gateway with a serverless architecture. Specifically, as depicted in FIG. 5, the bot gateway 400 may be implemented by one or more components (which also may be referred to as cloud components) that are maintained and executed in the cloud, i.e., the cloud platform 450. As used herein, a serverless architecture is defined as a computing execution model in which a service provider of a cloud platform dynamically manages an allocation and provisioning of remote servers for achieving a desired functionality. It will be appreciated that a "serverless" cloud platform may dynamically manage allocation of computing resources, but still require servers. In example embodiments, the cloud components of the bot gateway 400 may include one or more cloud databases 430, which, as discussed more below, may be used to persistently store a bot schema and bot configuration data sets. The cloud components of the bot gateway 400 may also include one or more cloud caches 435. As discussed more below, the cloud caches 435 may be used to temporarily store session state data for use when performing logic functions within a session. The cloud components also may include one or more cloud computing functions 440 for stateless execution of logic associated with the embodiments provided herein, particularly those methods depicted in FIGS. 7 and 8.

Figure 6:
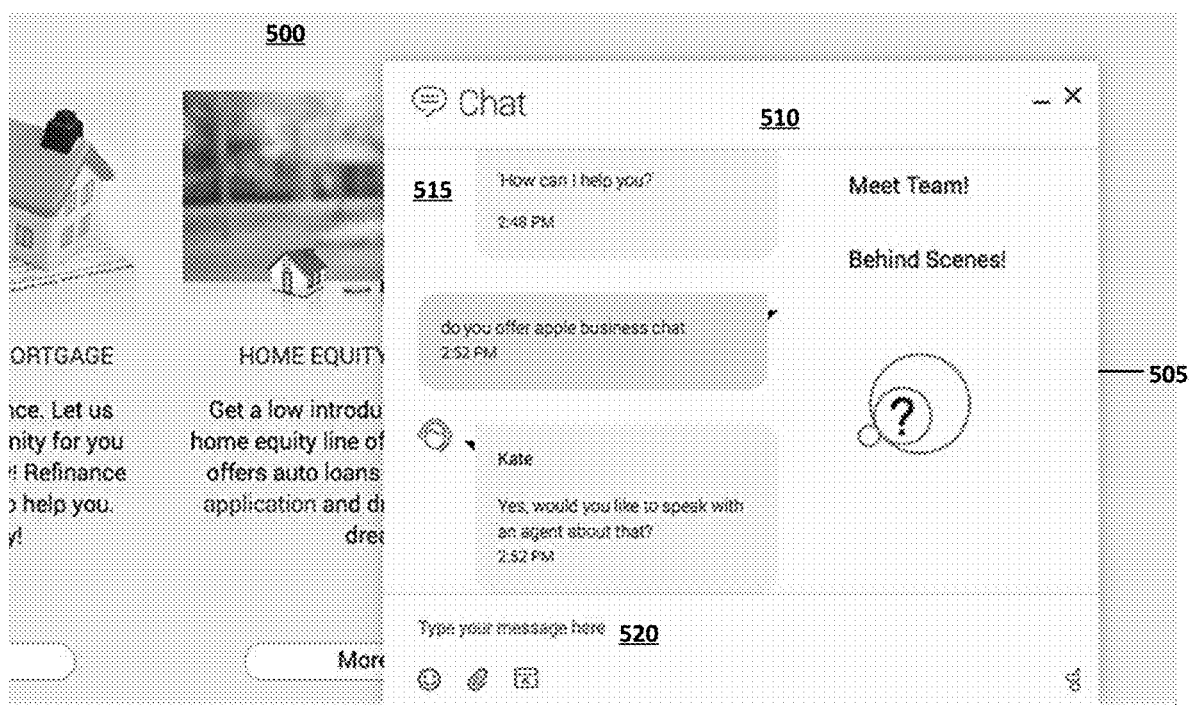
FIG. 6 is an exemplary customer chat interface according to embodiments of the present invention.

Brief reference will now be made to FIG. 6, in which an exemplary webpage 500 having a chat feature 505 is shown. The webpage 500, for example, may be associated with a business or enterprise website of one of the tenants for initiating interaction between prospective or current customers visiting the webpage and a contact center associated with the enterprise. As shown, the chat feature 505 may be contained within a defined portion of the webpage 500 and, for example, may be implemented as a widget or application via the systems and components described above and/or any other conventional means. As will be appreciated, the chat feature 505 includes an exemplary way for users or customers to enter the text messages that the bot gateway 400 will format and deliver to various bots, which will be discussed in more detail in relation to FIGS. 7 and 8.

As an example, the webpage 500 may be accessed by a customer via a customer device, which provides a communication channel for interacting with bots, chatting with chatbots and/or the like. In an embodiment, as shown, the chat feature 505 includes an interface generated on a screen of the customer device, such as customer device 105. This user interface of the chat feature 505 may be referred to herein as a customer chat interface 510. The customer chat interface 510, for example, may be generated by a customer interface module of a chat server, as already described. The customer interface module may send signals to the customer device that are configured to generate a desired customer chat interface 510 in accordance with the content of a chat message issued by a chat source, which as depicted is a chatbot named "Kate". The customer chat interface 510 may be contained within a designated area or window, with that window covering a designated portion of the webpage 500. The customer chat interface 510 also may be a text display area 515, which is the area dedicated to the display of received and sent text messages. and a text input area 520, which facilitates the customer's input of text messages. Though this may be achieved in other ways, the chat interface of FIG. 6 illustrates one manner by which text messages may be entered by customers and directed to the bot gateway 400.

Discussion now will focus on how customer text messages, once received, are properly formatted within the bot gateway for eventual delivery to bots. In accordance with example embodiments, the present invention first may include providing a bot gateway, such as the bot gateway 400 discussed above. As already stated, the bot gateway of the present invention may be constructed on a serverless or cloud platform. As an example, a cloud platform provided under the tradenames of Amazon Web Services or Google may be used to do this.

According to example embodiments, the bot gateway 400 may store or access to data related to the bot schemas. As used herein, a bot schema defines a data field arrangement in accordance with a unique template for sending requests to a particular one of the bots. That is, the bot schema includes a template that defines how the bot gateway may communicates with different bots. In example embodiments, the data associated with the bot schema may be persistently stored in the cloud, for example, within the cloud database 430 of FIG. 5. In accordance with exemplary embodiments, multiple bot schema may be arranged within a bot schema library that is stored in the cloud. In practice, for example, the bot schema library may be stored in a database that goes by the tradename DynamoDB. In use, as will be seen, the bot schema may be used to dynamically generate request templates in accordance with the particular arrangements needed for respective bots as well as support synchronous responses from those bots.

According to example embodiments, the bot gateway may further store or have access to bot configuration data sets. Each of the bot configuration data sets may include data values related to respective usage cases pairing a particular one of the bots with a particular one of the tenants. Thus, according to example embodiments, bot configuration data sets may include tenant-based information related to identifying a particular tenant relative to a request being directed to a particular bot. For example, bot configuration data sets may be used by a bot provider to authenticate a tenant's use of a particular bot. In example embodiments, the data associated with the bot configuration data sets may be persistently stored in the cloud. For example, the multiple bot configuration data sets may be arranged in a bot configuration library that is stored in the cloud, for example, within the cloud database 430 of FIG. 5. As with the bot schema library, for example, the bot configuration library may be stored in the database that goes by the tradename DynamoDB. In alternative embodiments, the bot configuration data sets may be provided to the bot gateway in ways that do not include storing and retrieval from a cloud database. For example, data associated with the bot configuration data sets may be attached to customer messages and provided to the bot gateway with the customer message.

The bot gateway may further include session state data, which may be used within a session by bots/bot providers to determine next actions. In example embodiments, such session state data is temporarily stored in a cache. For example, the cache may be maintained in the cloud, for example, within the cloud cache 435 of FIG. 5. In practice, for example, embodiments of the present invention may use a cache that goes by the tradename Redis.

The bot gateway may further include cloud computing functions, e.g., the cloud computing functions 440 of FIG. 5, for stateless execution of logic associated with the methods and processes of the present invention. In accordance with an exemplary embodiment, the bot gateway may be configured as the summation of cloud computing functions orchestrated into "state machines". As an example, cloud computing functions that go under the tradename AWS Lambda Functions may be used. In such cases, the AWS Lambda Functions may be orchestrated into such "state machines" via the use of AWS step function workflows. According to embodiments, such workflows may be triggered by monitoring a data stream or event bus for bot-related events. As an example, a data stream going under the tradename Kinesis may be monitored for bot-related events, such as customer messages, which then activate bot gateway workflows.

In example embodiments, the present invention further includes using the bot gateway 400 in processes that format customer messages for delivering to bots. An example of one of these processes may include the following steps.

First, a message from a customer may be received by the bot gateway, which, for the sake of this example, will be referred to as a first message. As stated, according to example embodiments, the step of receiving the first message may include monitoring an event bus or data stream for detecting the first message therein and thereby triggering the reception of the first message. Other conventional methods and system may also be used for the bot gateway to receive the first message.

Second, the received first message may be analyzed to determine the applicable, related, or pertinent parties to the first message as well as other information. For example, relative to the first message, this step may include determining: a pertinent one of the customers, i.e., who the first message is from (hereinafter designated as a "first customer"); a pertinent one of the tenants, i.e., which tenant is the first customer a customer of (hereinafter designated as a "first tenant"); and/or a pertinent one of the bots, i.e., to which bot is the first message directed (hereinafter designated as a "first bot"). This step may also include determining the text message included within the first message. As will be appreciated, the text message is the actual text inputted by the first customer that is intended for delivery to the first bot.

Third, a bot configuration data set may be provided. As described, the bot configuration data set may include data values related to a usage case pairing the first tenant with the first bot. According to example embodiments, the data values stored within the bot configuration data set include ones that are used for authenticating usage of a particular bot by a particular tenant (or, more particularly, usage of the particular bot by a customer of the particular tenant). Thus, as used herein, the term "usage case" references a particular tenant-bot pairing, with the data values of the bot configuration data set being used to authenticate and allow the desired usage to occur. For example, the data values within the bot configuration data set may be used to authenticate the first customer's usage of the first bot based on a relationship (for example, a customer relationship) between the first customer and the first tenant. In cases where a bot configuration library is provided, the step of providing the bot configuration data set may include selecting the appropriate bot configuration data set from the bot configuration library. As will be appreciated, this selection may be based on a relatedness or pertinence between the bot configuration data set and the particular usage case that pairs the first tenant with the first bot.

Fourth, a first one of the bot schemas (hereinafter "first bot schema") that pertains to the first bot may be selected from the bot schema library. As stated, each of the bot schemas may define a data field arrangement in accordance with a unique template for sending requests to a particular one of the bots. Thus, in this example, the first bot schema may define a data field arrangement in accordance with a template for sending requests to the first bot. As will be appreciated, these types of templates may be defined by the different bot providers.

Fifth, a formatted request may be created by mapping the text message (i.e., the entered by the customer) and the data values defined in the bot configuration data set to corresponding data fields defined within the data field arrangement of the first bot schema. An example of how this step is completed is best illustrated in the formatting progression depicted in FIG. 7.

And sixth, with the customer message being properly formatted, the formatted request may be sent to the first bot.

Figure 7:
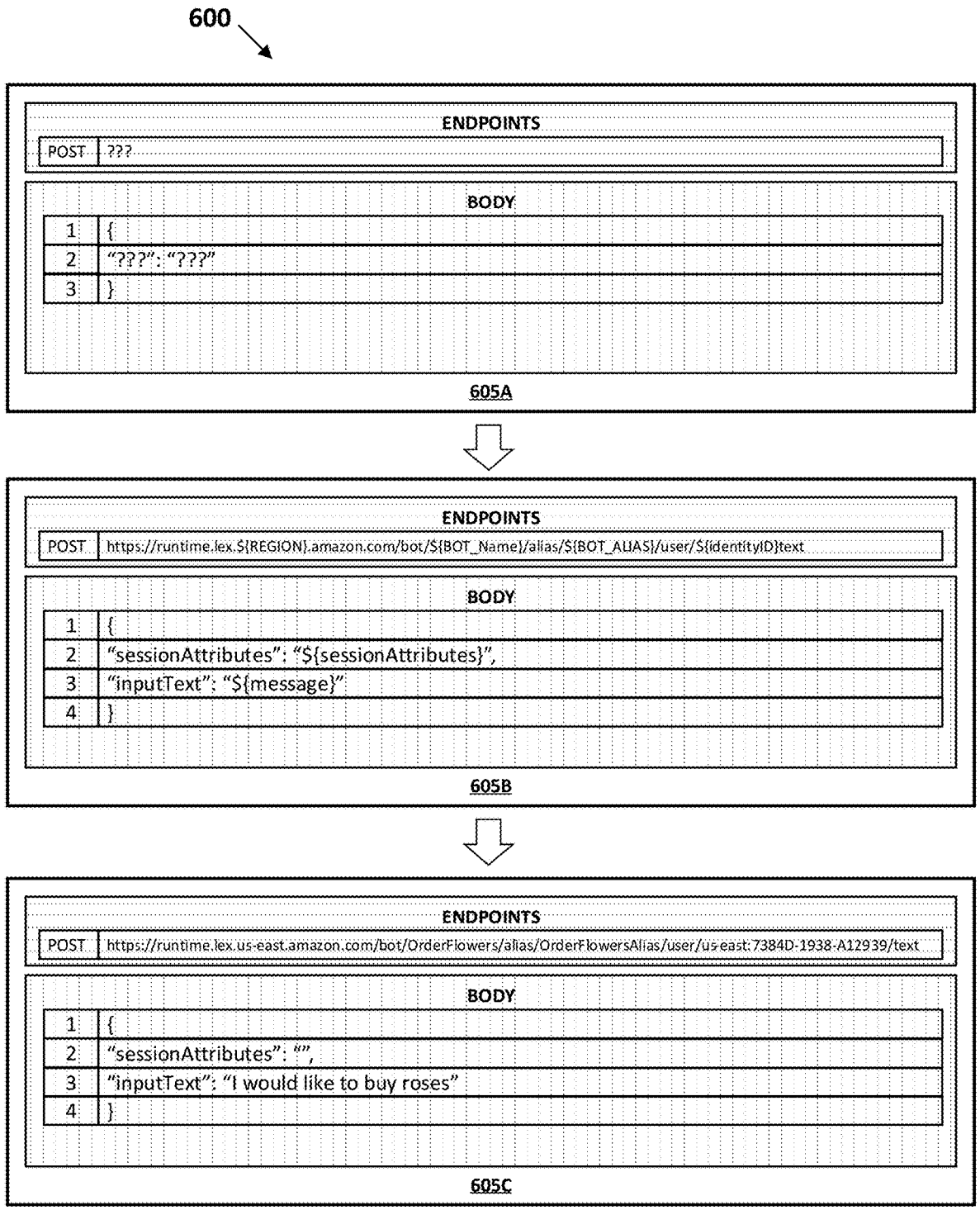
FIG. 7 is representation of a progression of the formatting of a request for sending to a bot according to embodiments of the present invention.
Figure 8:
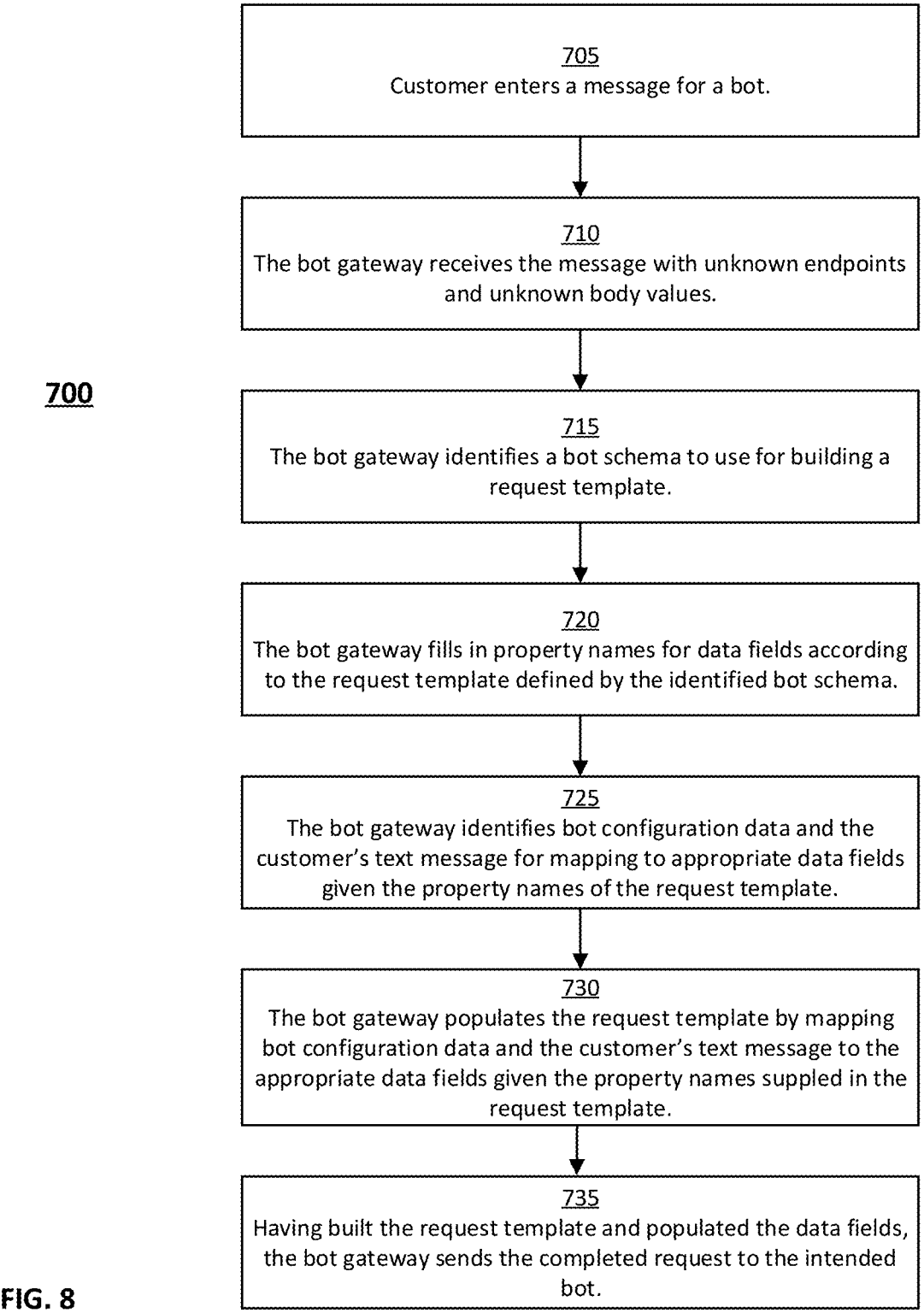
FIG. 8 is a flow diagram illustrating a method according to embodiments of the present invention.

With reference now specifically to FIGS. 7 and 8, particular examples are provided demonstrating how the above method may unfold in practice. As will be appreciated, FIG. 7 includes an example formatting progression 600 demonstrating how a customer message is formatted before being sent to a particular bot, while FIG. 8 includes a flow diagram depicting an example method 700 by which this may be done.

In regard to FIG. 7, an example formatting progression 600 is provided that demonstrates how a customer's message progresses from a text message to a formatted request that can be successfully sent to a particular bot. As will be appreciate, FIG. 7 includes three such progression snapshots, a first progression snapshot 600A, a second progression snapshot 600B, and a third progression snapshot 600C. As indicated in each, typically, a formatted request includes two primary sections: an endpoint section; and a body section.

As shown, the first progression snapshot 600A reflects an initial stage of formatting by the bot gateway of a customer message. As indicated by the several question marks, when initially received, much of the required data is unknow. More specifically, during this initial stage, both the endpoint section and the body section comprise unknowns.

As shown, the second progression snapshot 600B reflects a customer message further advanced in the formatting process. In this snapshot, the message has been formatted pursuant to a selected bot schema. Thus, the data fields have been identified and named within the data field arrangement that is defined by the bot schema. However, actual data values for those data fields (which, for example, may come from the bot configuration data set) remain blank. As also shown, the bot schema may include a template for formatting an endpoint statement for use within the endpoint section of the message. It will be appreciated that the endpoint statement provides a destination for directing the formatted request to the intended bot. However, in this stage of formatting, the actual data values within that statement remain empty. As will be appreciated, data values stored within the bot configuration data set may include data values for plugging into or completing the endpoint statement.

Finally, the third progression snapshot 600C reflects a fully formatted request in which the data values from the appropriate bot configuration data set and the text message have been mapped into the corresponding data fields of the bot schema. At this point, the data field arrangement defined by the bot schema has been filled with appropriate data values found within the bot configuration data set. Further, as shown, the text within the customer's message has been mapped to a corresponding data field defined within the body section.

As shown in FIG. 8, the method 700 is presented in accordance with the present invention. The method 700 may include an initial step 705 where a customer inputs a message for a bot. At step 710, the bot gateway may receive the message. As stated, at this point, the message may have unknown endpoints and unknown body values.

At step 715, the bot gateway may identify a particular bot schema to use when building a request template for the message. Then, using that particular bot schema in step 720, the bot gateway may fill in property names for data fields in accordance with the request template defined by the bot schema.

At step 725, the bot gateway identifies bot configuration data and the customer's text message for mapping to appropriate data fields given the property names of the request template. Then, at step 730, the bot gateway populates the request template by mapping bot configuration data and the text message to the appropriate data fields. Having now built the request template and populated the data fields, at step 735, the bot gateway sends the properly formatted request to the intended bot.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected. Hence, the proper scope of the present invention should be determined only by the broadest interpretation of the appended claims so as to encompass all such modifications as well as all relationships equivalent to those illustrated in the drawings and described in the specification.

The invention claimed is:

1. A processor-implemented method that facilitates delivery of messages from customers to bots, wherein tenants use a software program over a network to manage interactions with respective ones of the customers, and wherein the bots are created by respective bot providers, the method including the steps of:

receiving a plurality of bot schemas from respective ones of the bot providers, each of the plurality of bot schemas comprising a bot schema corresponding to a particular one of the bots;

providing a bot gateway, wherein:
the bot gateway includes a bot configuration library, the bot configuration library storing bot configuration data sets, each of which comprises data values related to respective usage cases pairing a particular one of the bots with a particular one of the tenants;
the bot gateway includes a bot schema library in which is stored the plurality of bot schemas; and
each of the plurality of bot schemas defines a data field arrangement in accordance with a unique template for sending requests to a particular one of the bots; and pursuant to a process, using the bot gateway to format the messages for delivering to the bots, the process comprising the steps of:
receiving a first one of the messages (hereinafter "first message")
analyzing the first message to determine therefrom:
a pertinent one of the customers (hereinafter designated as a "first customer");
a pertinent one of the tenants (hereinafter designated as a "first tenant");
a pertinent one of the bots (hereinafter designated as a "first bot"); and
a text message from the first customer that is intended for delivery to the first bot;
providing a bot configuration data set, the bot configuration data set comprising data values related to a usage case pairing the first tenant with the first bot, wherein the step of providing the bot configuration data set comprises:
selecting at least a portion of the bot configuration data set from the bot configuration library based on a pertinence of the bot configuration data set to the usage case that pairs the first tenant with the first bot; and
receiving at least a portion the bot configuration data set as part of the first message;
selecting from the bot schema library a first one of the plurality of bot schemas (hereinafter "first bot schema") that pertains to the first bot;
creating a formatted request via mapping the text message and the data values defined in the bot configuration data set to corresponding data fields defined within the data field arrangement of the first bot schema; and
sending the formatted request to the first bot.

2. The method according to claim 1, wherein the software program is provided to the tenants according to a multi-tenancy arrangement, and wherein the software program relates to customer relation management via managing an operational aspect of a contact center;
    wherein the software program comprises a feature that includes a user interface that facilitates the first customer inputting the text message of the first message;
    wherein the first bot comprises a chat bot.

3. The method according to claim 1, wherein the bot gateway comprises a serverless architecture in which one or more cloud components are maintained and executed within a cloud platform.

4. The method according to claim 3, wherein the one or more cloud components include a first cloud component, the first cloud component comprising one or more cloud computing functions for stateless execution of logic associated with the process.

5. The method according to claim 4, wherein the bot gateway includes a second cloud component that comprises one or more cloud databases;
    wherein the one or more cloud databases are configured to persistently store the bot schema library; and
    wherein the first bot comprises a chatbot.

6. The method according to claim 5, wherein the bot gateway includes a bot configuration library, the bot configuration library storing bot configuration data sets, each of which comprises data values related to respective usage cases pairing a particular one of the bots with a particular one of the tenants;
    wherein the step of providing the bot configuration data set comprises selecting the bot configuration data set from the bot configuration library based on a pertinence of the bot configuration data set to the usage case that pairs the first tenant with the first bot; and
    wherein the one or more cloud databases are configured to persistently store the bot configuration library.

7. The method according to claim 6, wherein the bot gateway includes a third cloud component that comprises one or more cloud caches;
    wherein the one or more cloud caches are configured to temporarily store session state data for use when performing the steps of the process; and
    wherein the software program is provided to the tenants according to a multitenancy arrangement, and wherein the software program is configured to manage an operational aspect of a contact center.

8. The method according to claim 6, wherein the step of receiving the first message includes monitoring an event bus data stream for detecting the first message therein.

9. The method according to claim 6, wherein the data values stored within the bot configuration data set comprise data values for authenticating the first customer's use of the first bot based on a relationship between the first customer and the first tenant.

10. The method according to claim 6, wherein the formatted request comprises two sections: an endpoint section; and a body section;
    wherein the first bot schema includes a template for formatting an endpoint statement for use within the endpoint section of the first message, the endpoint statement providing a destination for directing the formatted request to the first bot; and
    wherein the data values stored within the bot configuration data set comprises data values for completing the endpoint statement.

11. The method according to claim 10, wherein the text message is mapped to a corresponding data field defined within the body section.

12. The method according to claim 10, wherein, when received by the bot gateway, the first message comprises an unknown endpoint section and an unknown body section.

13. A system that facilitates delivery of messages from customers to bots, wherein tenants use a software program over a network to manage interactions with respective ones of the customers, and wherein the bots are created by respective bot providers, the system comprising:
    a hardware processor; and
    a bot gateway, wherein:
        the bot gateway comprises a bot configuration library, the bot configuration library storing bot configuration data sets, each of which comprises data values related to respective usage cases pairing a particular one of the bots with a particular one of the tenants;
        the bot gateway includes a bot schema library in which is stored a plurality of bot schemas; and
        each of the plurality of bot schemas defines a data field arrangement in accordance with a unique template for sending requests to a particular one of the bots;
    a machine-readable storage medium on which is stored instructions that cause the hardware processor to execute a process for using the bot gateway to format the messages for delivering to the bots, wherein the process comprises the steps of:
        receiving the plurality of bot schemas from respective ones of the bot providers, each of the plurality of bot schemas comprising a bot schema corresponding to a particular one of the bots;
        receiving a first one of the messages (hereinafter "first message")
        analyzing the first message to determine therefrom:
            a pertinent one of the customers (hereinafter designated as a "first customer");
            a pertinent one of the tenants (hereinafter designated as a "first tenant");
            a pertinent one of the bots (hereinafter designated as a "first bot"); and
            a text message from the first customer that is intended for delivery to the first bot;
        providing a bot configuration data set, the bot configuration data set comprising data values related to a usage case pairing the first tenant with the first bot, wherein the step of providing the bot configuration data set comprises:
            selecting at least a portion of the bot configuration data set from the bot configuration library based on a pertinence of the bot configuration data set to the usage case that pairs the first tenant with the first bot; and
            receiving at least a portion the bot configuration data set as part of the first message;
        selecting from the bot schema library a first one of the plurality of bot schemas (hereinafter "first bot schema") that pertains to the first bot;
        creating a formatted request via mapping the text message and the data values defined in the bot configuration data set to corresponding data fields defined within the data field arrangement of the first bot schema; and
        sending the formatted request to the first bot.

14. The system according to claim 13, wherein the first bot comprises a chat bot; and wherein the software program is provided to the tenants according to a multitenancy arrangement, and wherein the software program is configured to manage an operational aspect of a contact center.

15. The system according to claim 13, wherein the bot gateway comprises a serverless architecture in which one or more cloud components are maintained and executed within a cloud platform; and wherein the one or more cloud components include:
one or more cloud computing functions for stateless execution of logic associated with the process; and
one or more cloud databases, the one or more cloud databases being configured to persistently store the hot schema library and the hot configuration library.

16. The system according to claim 15, wherein the one or more cloud components comprise one or more cloud caches, the one or more cloud caches being configured to temporarily store session state data for use when performing the steps of the process.

17. The system according to claim 15, wherein the step of receiving the first message includes monitoring an event bus data stream for detecting the first message therein; and wherein the data values stored within the bot configuration data set comprise data values for authenticating the first customer's use of the first bot based on a relationship between the first customer and the first tenant.

* * * * *